United States Patent
Tsay et al.

(10) Patent No.: US 12,404,385 B2
(45) Date of Patent: Sep. 2, 2025

(54) MECHANICAL METAMATERIAL WITH IMPROVED COMPRESSIVE RESPONSES

(71) Applicant: Feng Chia University, Taichung (TW)

(72) Inventors: Chien-Yie Tsay, Taichung (TW); Jiun-Hung Chen, Taichung (TW)

(73) Assignee: Feng Chia University, Taichung (TW)

( * ) Notice: Subject to any disclaimer, the term of this patent is extended or adjusted under 35 U.S.C. 154(b) by 648 days.

(21) Appl. No.: 17/842,991

(22) Filed: Jun. 17, 2022

(65) Prior Publication Data

US 2023/0212372 A1 Jul. 6, 2023

(30) Foreign Application Priority Data

Jan. 3, 2022 (TW) ................. 111100097

(51) Int. Cl.
*C08K 3/04* (2006.01)
*B33Y 80/00* (2015.01)
(Continued)

(52) U.S. Cl.
CPC .............. *C08K 3/041* (2017.05); *B33Y 80/00* (2014.12); *C08K 9/04* (2013.01); *B82Y 40/00* (2013.01); *Y10T 428/24* (2015.01); *Y10T 428/24149* (2015.01); *Y10T 428/24174* (2015.01); *Y10T 428/24273* (2015.01); *Y10T 428/24298* (2015.01)

(58) Field of Classification Search
CPC .......... C08K 3/041; C08K 9/04; B33Y 80/00; B82Y 40/00; B82Y 30/00; Y10T 428/24; Y10T 428/24149; Y10T 428/24174; Y10T 428/24273; Y10T 428/24298
See application file for complete search history.

(56) References Cited

U.S. PATENT DOCUMENTS

| | | | |
|---|---|---|---|
| 9,995,359 B2 * | 6/2018 | Martino Gonzalez | .... B32B 1/08 |
| 12,055,612 B2 * | 8/2024 | Park | ........................ G01R 33/36 |

(Continued)

FOREIGN PATENT DOCUMENTS

WO WO-2020143075 A1 * 7/2020

OTHER PUBLICATIONS

[NPL-1] Fu et al. (WO 2020/143075 A1); Jul. 16, 2020 (EPO machine translation to English). (Year: 2020).*

(Continued)

*Primary Examiner* — Donald M Flores, Jr.
(74) *Attorney, Agent, or Firm* — Best & Flanagan LLP

(57) ABSTRACT

A mechanical metamaterial comprising a chiral structure and a reentrant structure repeatedly layered to form a 3D structure with improved compressive response is disclosed. The 3D structure of the present invention is a metamaterial which can be perfectly and easily produced by a photocuring 3D printing process without any internal support. The introduction of modified carbon nanotubes into the printing composite material improves the compression resistance and impact resistance of the products and increases the service life through the special periodic structure. The application of 3D printing technology in fabricating mechanical metamaterials can break through the processing limitation of traditional processing technology or microelectronics manufacturing technology to make three-dimensional periodic structures.

6 Claims, 6 Drawing Sheets

(51) Int. Cl.
*C08K 9/04* (2006.01)
*B82Y 40/00* (2011.01)

(56) References Cited

U.S. PATENT DOCUMENTS

| | | | | |
|---|---|---|---|---|
| 2007/0172851 | A1* | 7/2007 | Yaniv | C12Q 1/6834 |
| | | | | 435/6.11 |
| 2007/0189387 | A1* | 8/2007 | Khabashesku | D06M 13/148 |
| | | | | 375/240.15 |
| 2011/0240194 | A1* | 10/2011 | Summers | B60C 9/18 |
| | | | | 428/116 |
| 2016/0353825 | A1* | 12/2016 | Bottlang | B32B 3/12 |
| 2017/0009036 | A1* | 1/2017 | Xie | B33Y 80/00 |
| 2022/0339892 | A1* | 10/2022 | Sun | B29C 70/545 |

OTHER PUBLICATIONS

[NPL-2] Chen, L.; Liu, C.; Wang, J.; Zhang, W.; Hu, C.; Fan, S.; "Auxetic materials with large negative Poisson's ratios based on highly oriented carbon nanotube structures"; Appl. Phys. Lett. 94, 25311 (2009). (Year: 2009).*

[NPL-3] Liu, Y.; Hu, H.; "A review on auxetic structures and polymeric materials"; Sci. Res. Essays, vol. 5 (10), May 18, 2010; pp. 1052-1063. (Year: 2010).*

[NPL-4] Kim, K.; Park, J; Suh, J.; Kim, M.; Jeong, Y.; Park, I.; "3D printing of multiaxial force sensors using carbon nanotube (CNT)/ thermoplastic polyurethane (TPU) filaments"; Sensors and Actuators A 263 (2017); pp. 493-500. (Year: 2017).*

* cited by examiner

MECHANICAL METAMATERIAL WITH IMPROVED COMPRESSIVE RESPONSES

FIELD OF INVENTION

The present invention is related to a structure with high compressibility, and especially to a mechanical metamaterial built up with regularly arranged three-dimensional structures to achieve extraordinary compressibility.

BACKGROUND OF THE INVENTION

In the past few decades, high-tech products have gradually become ubiquitous and are widely utilized in areas ranging from daily consumption to military applications. A main strategic direction in the development of such products by industry and researchers is the provision of multiple uses and services. Among the numerous the high-tech products, hand-held or wearable electronic devices are commonly used to provide greater interactions between people and the internet. The breadth of knowledge and the richness of life of the people are greatly improved by the support of such advanced electronic devices. Due to the diversity of applications of advanced electronic devices, many new demands and requirements are needed and guide the development of novel technologies.

In the rapid development of applications of science and technology, electronic devices play an important role as an intermediate medium. For the purpose of easy portability, the exterior morphology and weight of electronic device have gradually changed from large and heavy toward lighter, thinner, small, and more portable versions, and even flexible and foldable versions have been developed. However, such miniaturization entails sacrifices in shock absorbance or impact resistance. Currently, most electronic devices use sealants or micro screws to achieve fixation in the assembly. During the assembly process, a small amount of adhesive with elasticity is applied as a sealant to serve as a shock or impact-absorbing buffer. However, the shock absorbance and shock-resistant capabilities of such adhesive are insufficient.

Hence, there is a need to provide a buffer layer which is capable of dispersing stress and absorbing shocks and impacts between components or a gap within the external casing that will overcome or substantially ameliorate at least one or more of the deficiencies of the prior art, or to provide an alternative solution to the problems. It is to be understood that, if any prior art information is referred to herein, such reference does not constitute an admission that the information forms part of the common general knowledge in the art.

SUMMARY OF THE INVENTION

In order to solve the problem that most electronic products are fixed with sealant and micro screws having insufficient shock energy absorption and shock-resistance capabilities, the present invention provides a mechanical metamaterial with high compressibility comprising a first unit layer and a second unit layer that are repeatedly and alternately stacked and layered in a height direction into a three-dimensional structure, wherein:

the first unit layer comprises multiple first structure units which are repeatedly and regularly composed in a horizontal direction along a plane surface of the first unit layer, and the first structure units include six-bonded chiral structures;

the second unit layer comprises multiple second structure units which are repeatedly and regularly composed in a horizontal direction along a plane surface of the second unit layer, and the second structure units include four annular reentrant structures; and the mechanical metamaterial comprises elastic photocurable resin and carbon nanotubes (CNTs) modified with surface functional groups.

In accordance with the above description, the present invention has the following advantages:

1. The present invention takes advantage of the flexible manufacturing of three-dimensional printing (3D printing) technology to develop a highly efficient shock-resistance structure which can be applied to an electronic device as a shock or impact resistance buffer. Due to the combination of the mechanical metamaterial with regularly configured unit structures, the present invention can efficiently disperse and absorb external impacts and also reduce the amount of deformation of components or parts. By adding CNTs modified with surface functional groups to a suitable elastic photocurable resin, the present invention can produce a three-dimensional structure with high compressibility and impact resistance. The present invention has great potential for application as a buffer layer for an electronic device to achieve a great compressive response.

2. The mechanical metamaterial provided by the present invention can be produced with a digital light projection/processing 3D printing technology and successfully printed as a mechanical metamaterial structure without any internal supports during printing. The mechanical metamaterial is a combination of six-bonded chiral structures and optimized four annular reentrant structures which are regularly arranged in a three-dimensional structure to obtain high compressibility. Due to the addition of surface modified CNTs to the 3D printed composite material, the present invention can further improve the impact resistance and ensure that the internal structure has stronger and more durable mechanical properties.

Many of the attendant features and advantages of the present invention will become better understood with reference to the following detailed description considered in connection with the accompanying figures and drawings.

BRIEF DESCRIPTION OF THE DRAWINGS

The steps and the technical means adopted by the present invention to achieve the above and other objects can be best understood by referring to the following detailed description of the preferred embodiments and the accompanying drawings.

DETAILED DESCRIPTION OF THE PREFERRED EMBODIMENTS

Figure 1A:
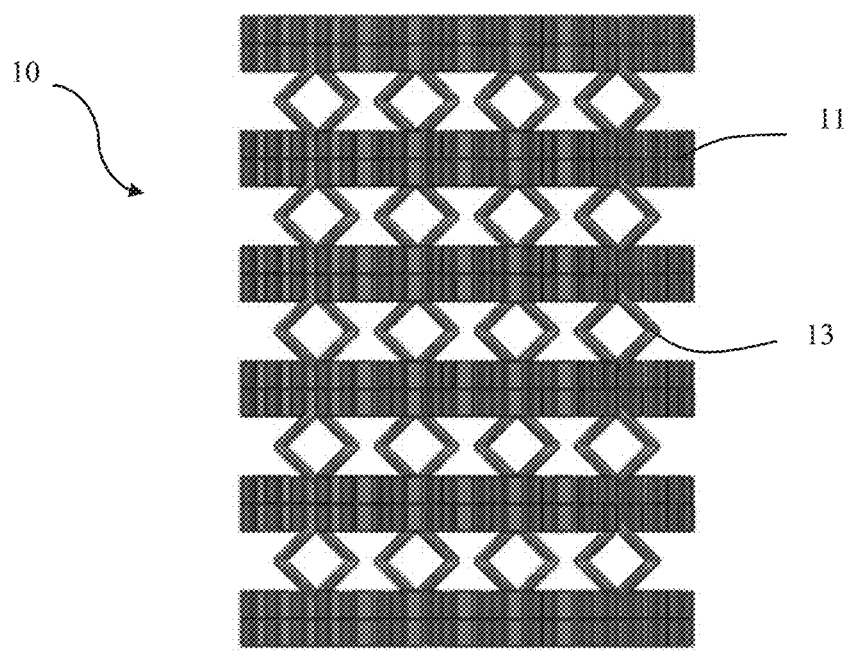
FIG. 1A presents a front view of the mechanical metamaterial of the present invention.
Figure 1B:
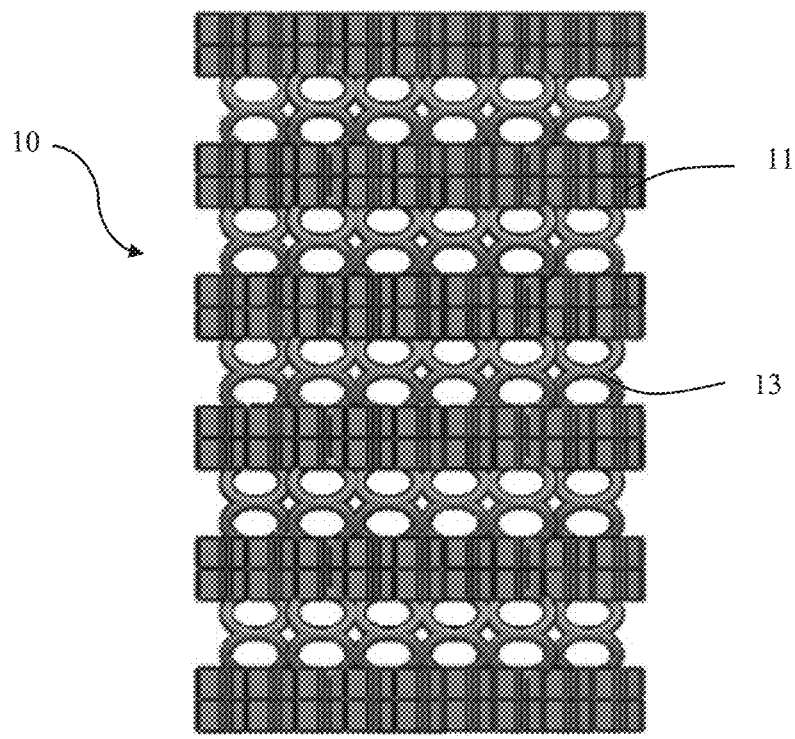
FIG. 1B presents a right side view of the mechanical metamaterial of the present invention.
Figure 1C:
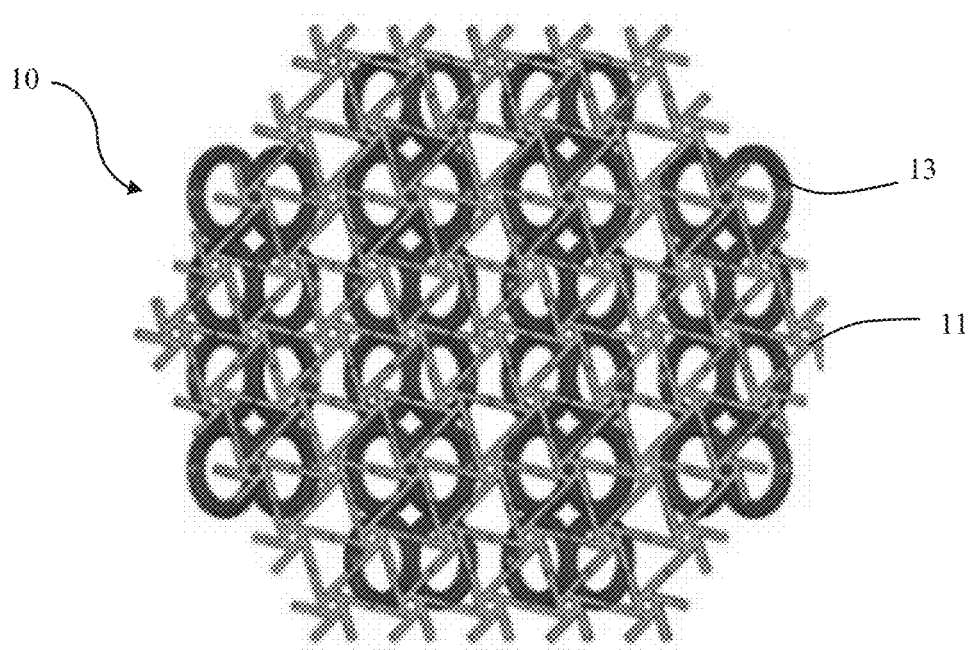
FIG. 1C presents a top view of the mechanical metamaterial of the present invention.
Figure 1D:
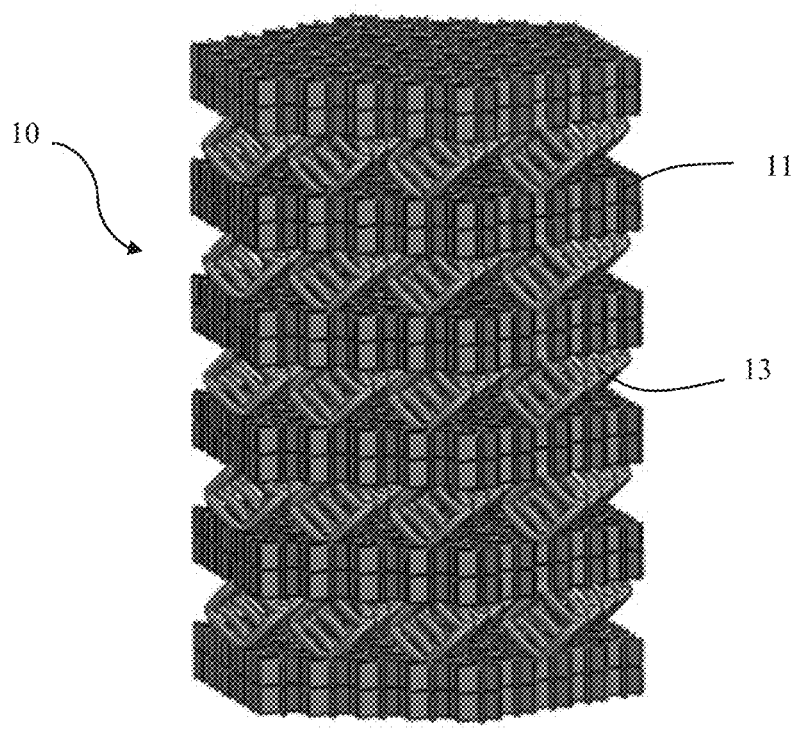
FIG. 1D presents an illustration of the mechanical metamaterial of the present invention.

Reference will now be made in detail to the present preferred embodiments of the invention, examples of which are illustrated in the accompanying drawings. Wherever possible, the same reference numbers are used in the drawings and the description to refer to the same or similar parts. The exemplary embodiments described herein are not intended to limit the method. In the following detailed description, for purposes of explanation, numerous specific details are set forth in order to convey a thorough understanding of the disclosed embodiments. It will be apparent, however, that one or more embodiments may be practiced without these specific details. As used in the description herein and throughout the claims that follow, the meaning of "a", "an", and "the" may include reference to the plural unless the context clearly dictates otherwise. Also, as used in the description herein and throughout the claims that follow, the terms "comprise or comprising", "include or including", "have or having", "contain or containing" and the like are to be understood to be open-ended, i.e., to mean including but not limited to.

<Mechanical Metamaterial with High Compressibility>

With reference to FIGS. 1A to 1D, the present invention provides a mechanical metamaterial 10 with high compressibility, which includes a first unit layer 11 and a second unit layer 13 that are repeatedly and alternately stacked or layered in a height direction into a three-dimensional structure. The mechanical metamaterial 10 with high compressibility has a negative Poisson's ratio, meaning that the mechanical metamaterial 10 can deform in different axial planes at the same time when subjected to any external compression force. By rapidly and efficiently increasing the density of the three-dimensional structure, the present invention is able to improve its mechanical strength and impact resistance.

Figure 2:
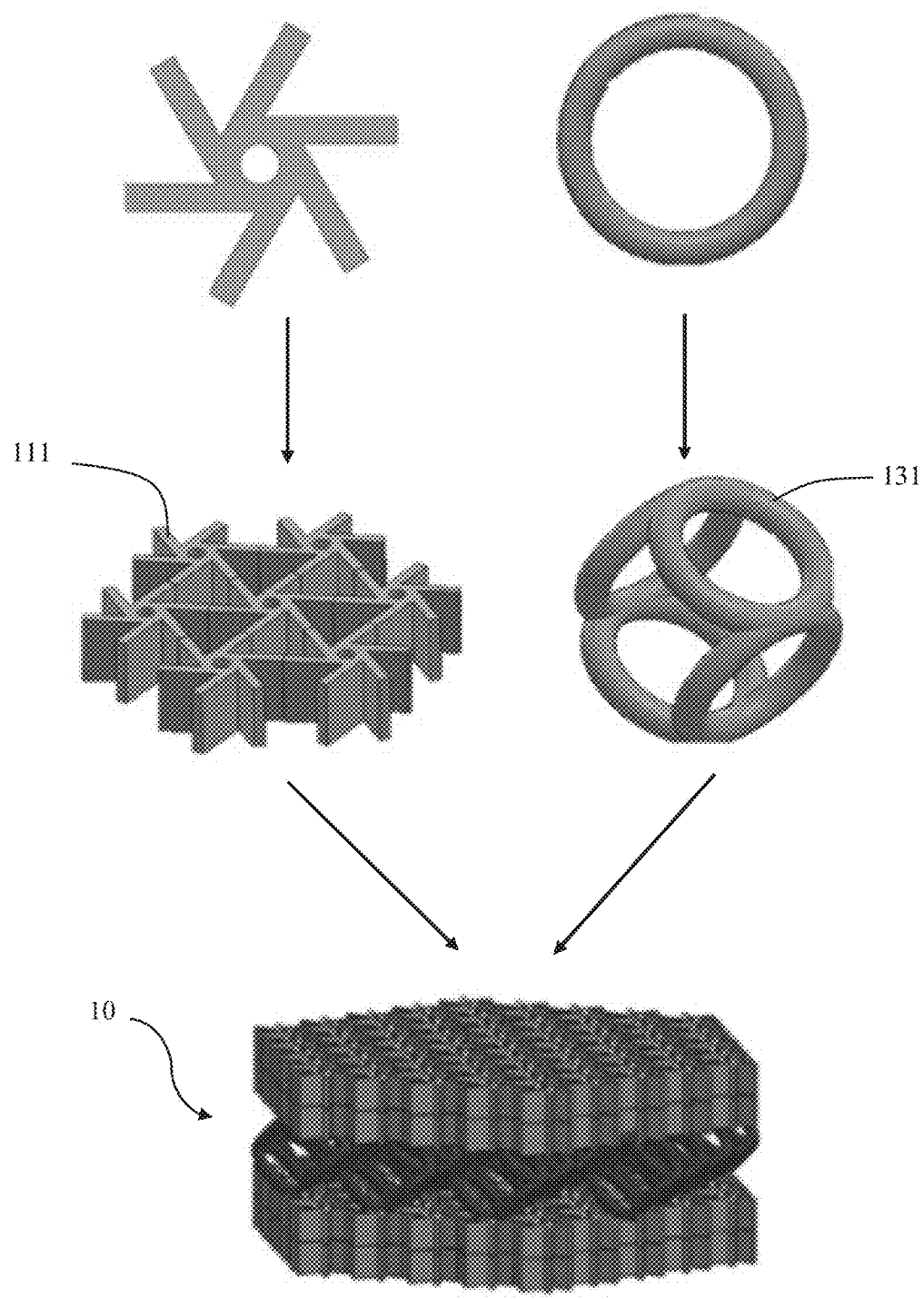
FIG. 2 presents a preferred embodiment illustrating the assembly of the first unit layer and the second unit layer of the present invention.

With reference to FIG. 2, the first unit layer 11 comprises multiple first structure units 111 which are repeatedly and regularly composed in a horizontal direction along a plane surface of the first unit layer 11. The first structure units 111 include six-bonded chiral structures. The second unit layer 13 comprises multiple second structure units 131 which are repeatedly and regularly composed in a horizontal direction along a plane surface of the second unit layer 13. The second structure units 131 include four annular reentrant structures regularly repeated and composed in the plane surface of the second unit layer 13.

The stated six-bonded chiral structure is shown in the top left corner of FIG. 2. Each of the first structure units 111 is a structure having a six-bonded chiral structure extending outwardly and radiating from a center circle at equal angles in the plane surface of the first unit layer 11. As shown in FIG. 2, the six-bonded chiral structure has such unit structures repeatedly extending in the vertical direction and having a thickness of preferably 2 mm in this preferred embodiment. The stated four annular reentrant structure is shown in the top right corner of in FIG. 2, which illustrates a three-dimensional square structure formed by connecting four circles or rings. Preferably, a width of each bond of the six-bonded chiral structure and a line diameter of the four annular reentrant structure are between 0.10 mm and 0.50 mm, or preferably 0.2 mm to 0.40 mm, or even more preferably 0.25 mm. When the line diameter is thicker, an overall density corresponding to the mechanical resistance ability of the whole structure of the present invention is increased. In contrast, when the line thickness is thinner, an overall density corresponding to the mechanical resistance ability of the whole structure of the present invention is decreased.

To connect the first unit layer 11 and the second unit layer 13, in one preferred embodiment of the present invention, the first structure unit 111 with a positive Poisson's ratio is arranged repeatedly at equal intervals in the plane surface of the first unit layer 11 (shown in FIG. 1C with a lighter color layer) and the four annular reentrant structures are layered on top of the first unit layer 11 at regular intervals as well. The present invention can be achieved by repeated layering of the first unit layer 11 and the second unit layer 13. As both the first unit layer 11 and the second unit layer 13 are considered the mechanical metamaterial, the present invention has a high energy-absorbing ability and excellent compressive properties in the longitudinal direction and a negative Poisson's ratio in the lateral direction for impact resistance.

<Materials and Production Method>

The present invention is preferably produced or fabricated by three-dimensional (3D) printing, and more preferably by a photocuring 3D printing method such as digital light projection 3D printing or digital light processing 3D printing. A material for 3D printing is preferably a soft and elastic photocurable resin, such as polyurethane (PU), thermoplastic polyurethane (TPU), rubber, silicone resin or a combination thereof. The material used in the present invention is preferably impregnated with carbon nanotubes (CNTs) modified with surface functional groups. Such functional groups include hydroxyl (—OH), aldehyde (—CO—), or carboxyl (—COOH) groups, or a combination thereof. The functional groups can be obtained by treating carbon nanotubes with a strong acid or a strong base.

A preferred embodiment for obtaining carbon nanotubes modified with hydroxyl surface functional groups includes the steps of:

evenly mixing 1 g of carbon nanotubes with acetone, followed by vibration with an ultrasonic device for 10 minute and drying in an oven;

mixing the dried carbon nanotubes with a solution containing 25 mL of nitric acid, at a concentration of 66 wt % and 25 mL of hydrogen peroxide, at a concentration of 35 wt %, and heating and stirring at a temperature of 60° C. and rotating at a speed of 700 rpm for 12 hours;

centrifuging the mixed solution at a high speed of 9000 rpm for 10 minutes to separate the carbon nanotubes from the solution;

optionally, grinding the CNTs to an ideal size (400 mesh in this preferred embodiment) according to the user demand to obtain carbon nanotubes modified with hydroxyl surface functional groups.

Next, mixing the carbon nanotubes modified with hydroxyl surface functional groups and elastic photocurable resin to obtain a photocurable composite 3D printing resin of the present invention.

<Validation Tests>

The above photocurable composite 3D printing resin is 3D printed to obtain the mechanical metamaterial 10 having high compressibility, and the excellent mechanical properties of the mechanical metamaterial 10 will be described as follows.

Figure 3:
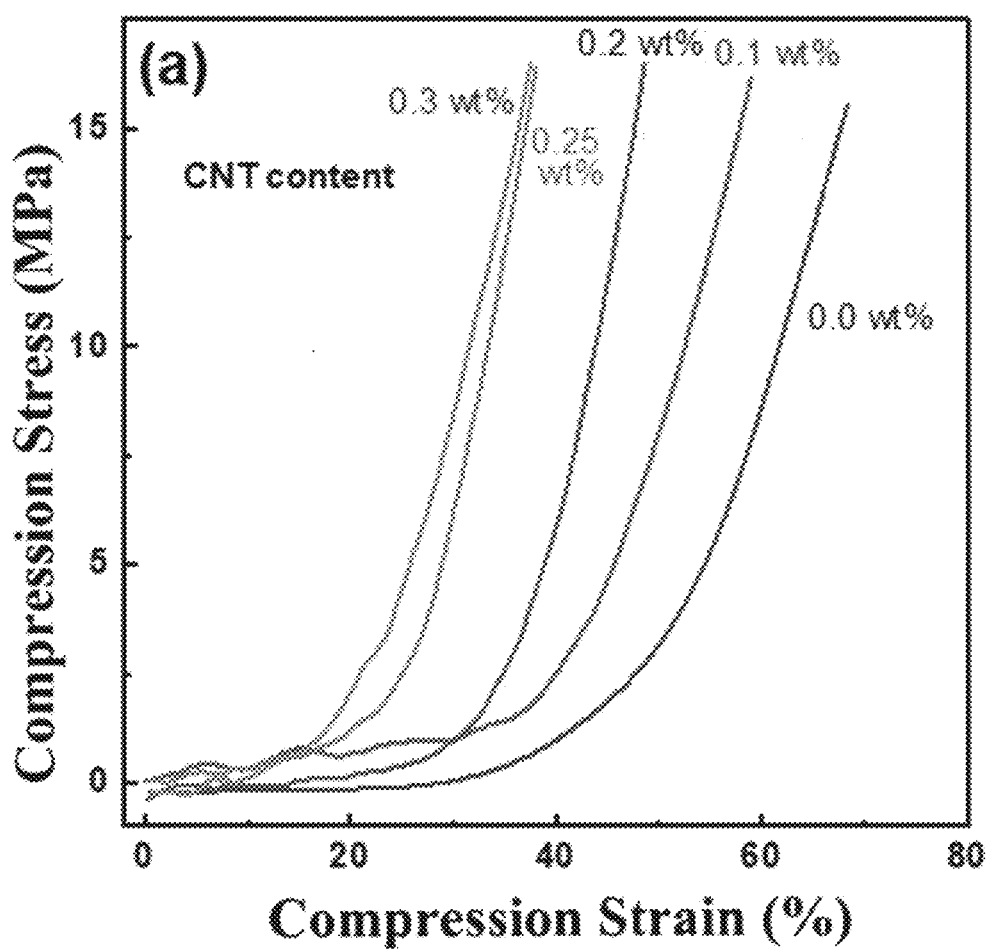
FIG. 3 presents a comparison result of the compressive stress-strain properties of multiple embodiments of the present invention.

FIG. 3 presents a comparison of the compressive stress-strain properties of multiple embodiments of the present invention. The embodiments include the CNTs modified with surface functional groups at contents of 0.0 wt % (which is a comparative example), 0.1 wt %, 0.2 wt %, 0.25 wt %, and 0.3 wt %, respectively. As shown in FIG. 3, when the content (or ratio) of CNTs in the composite material is increased, the compressive stress-strain curve shifts to the left, indicating that the mechanical strength of the 3D-printed mechanical metamaterial 10 is greater.

Figure 4:
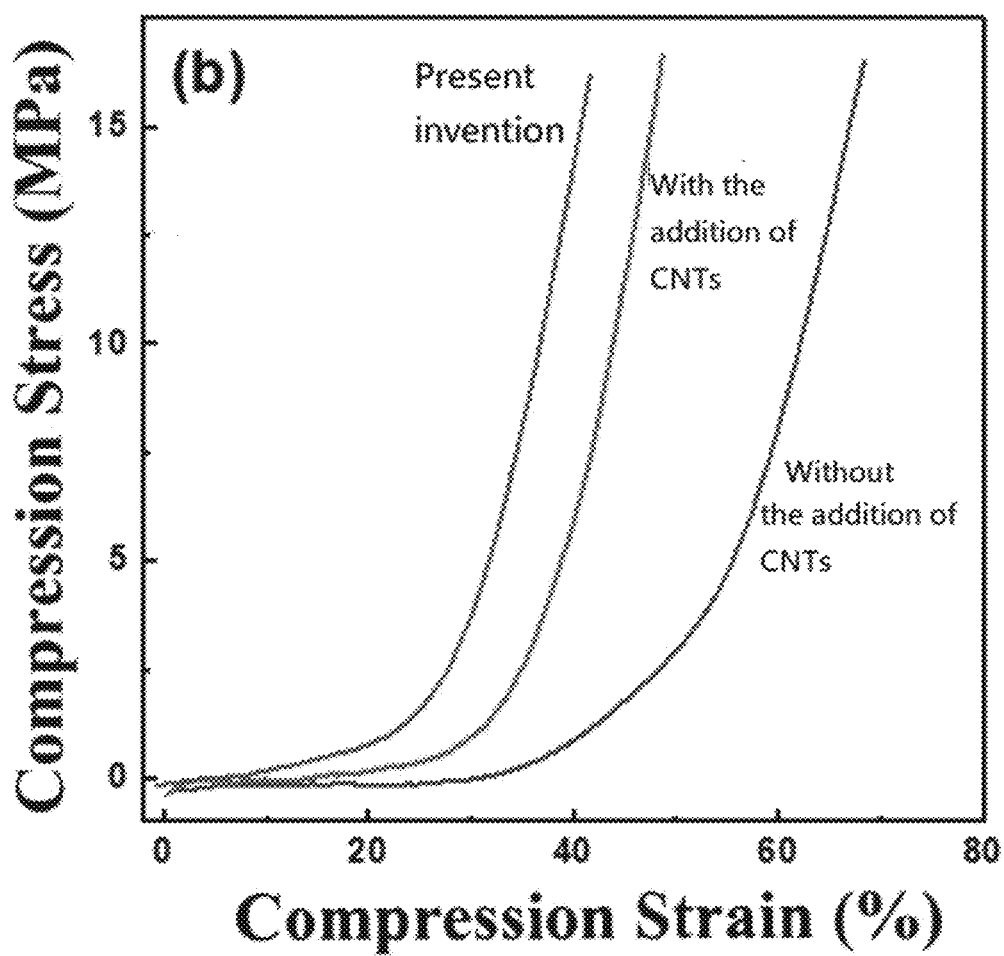
FIG. 4 presents the compressive stress-strain comparison results of the mechanical metamaterial of the present invention with and without the addition of surface unmodified carbon nanotubes (at a concentration of 0.25 wt %) and with the addition of surface modified carbon nanotubes (0.25 wt %).

FIG. 4 presents the compressive stress-strain comparison results of the mechanical metamaterial of the present invention with and without the addition of surface unmodified carbon nanotubes (at a concentration of 0.25 wt %) and with the addition of surface modified carbon nanotubes (0.25 wt %). The results confirm that the mechanical strength of the composite with CNTs is better than that of the embodiment of without CNTs. However, the embodiment with the addition of surface-modified carbon nanotubes (0.25 wt %) has the best mechanical strength among all the embodiments.

Figure 5:
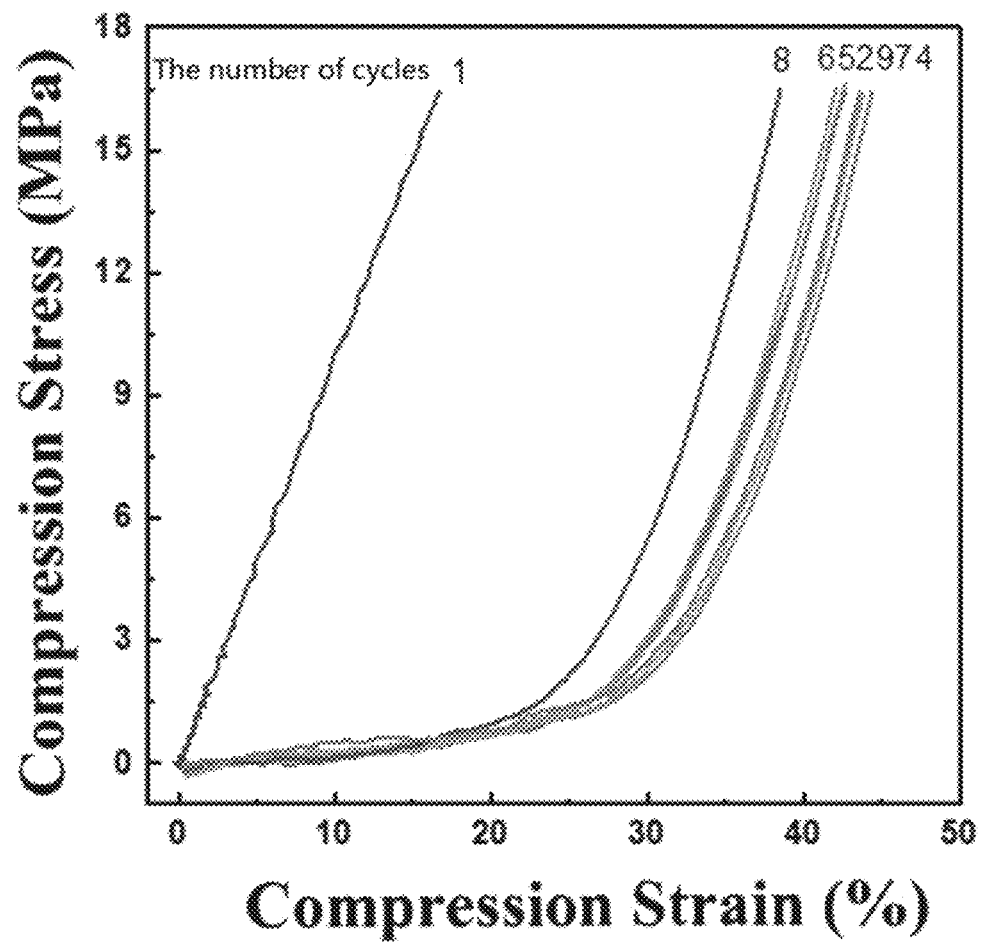
FIG. 5 presents comparison results of the printed sample with 2.5 wt % carbon nanotubes modified with surface functional groups after different numbers of cycles of compressive stress-strain tests of one embodiment of the present invention.

FIG. 5 presents comparison results of the printed sample added with 2.5 wt % carbon nanotubes modified with surface functional groups after different numbers of cycles of compressive stress-strain tests of one embodiment of the present invention. As shown in FIG. 5, an optimum addition ratio of the carbon nanotubes modified with surface functional groups of the present invention is preferred to be in a range of 0.1 to 0.3 wt %, or more preferably 0.2 to 0.25 wt %.

The above specifications, examples, and data provide a complete description of the present disclosure and the use of exemplary embodiments. Although various embodiments of the present disclosure have been described above with a certain degree of particularity, or with reference to one or more individual embodiments, those with ordinary skill in the art could make numerous alterations or modifications to the disclosed embodiments without departing from the spirit or scope of this disclosure.

What is claimed is:

1. A mechanical metamaterial with high compressibility comprising a first unit layer and a second unit layer that are repeatedly and alternately stacked or layered in a height direction into a three-dimensional structure, wherein:
the first unit layer comprises multiple first structure units which are repeatedly and regularly composed in a horizontal direction along a plane surface of the first unit layer, and the first structure units include six-bonded chiral structures; the six-bonded chiral structure is a structure having six-bonds extending outwardly and radiating from a center circle at equal angles in the plane surface of the first unit layer;
the second unit layer comprises multiple second structure units which are repeatedly and regularly composed in a horizontal direction along a plane surface of the second unit layer, and the second structure units includes four annular reentrant structures; the four annular reentrant structure is a structure having a three-dimensional square structure formed by connecting four circles or rings;
a width of each bond of the six-bonded chiral structure and a line diameter of the four annular reentrant structure are between 0.10 mm and 0.50 mm;
the mechanical metamaterial comprises an elastic photocurable resin impregnated with carbon nanotubes modified with surface functional groups;
the functional groups include hydroxyl (—OH), aldehyde (—CO—), or carboxyl (—COOH) groups, or a combination thereof; and
the elastic photocurable resin includes polyurethane (PU), thermoplastic polyurethane (TPU), rubber, silicone resin or a combination thereof.

2. The mechanical metamaterial as claimed in claim 1, wherein the mechanical metamaterial has a negative Poisson's ratio.

3. The mechanical metamaterial as claimed in claim 2, wherein a content of the carbon nanotubes modified with surface functional groups in the elastic photocurable resin is in a range of 0.1 to 0.3 wt %.

4. The mechanical metamaterial as claimed in claim 3, wherein: a content of the carbon nanotubes modified with surface functional groups in the elastic photocurable resin is in a range of 0.2 to 0.25 wt %.

5. The mechanical metamaterial as claimed in claim 1, wherein a content of the carbon nanotubes modified with surface functional groups in the elastic photocurable resin is in a range of 0.1 to 0.3 wt %.

6. The mechanical metamaterial as claimed in claim 5, wherein a content of the carbon nanotubes modified with surface functional groups in the elastic photocurable resin is in a range of 0.2 to 0.25 wt %.

* * * * *